United States Patent [19]
Pascal et al.

[11] Patent Number: 5,971,851
[45] Date of Patent: Oct. 26, 1999

[54] METHOD AND APPARATUS FOR MANAGING FAULTS AND EXCEPTIONS

[75] Inventors: Andrew Pascal, Woodside; Michael Barnett, Santa Clara; Clayton Wishoff, Foster City, all of Calif.

[73] Assignee: Silicon Gaming, Inc., Palo Alto, Calif.

[21] Appl. No.: 08/774,826

[22] Filed: Dec. 27, 1996

[51] Int. Cl.$^6$ .............................. H04G 9/00; A63F 9/22
[52] U.S. Cl. .................................. 463/24; 463/30
[58] Field of Search .................................. 463/12, 13, 16, 463/20, 24, 26, 30; 324/500, 511, 512; 364/737, DIG. 1; 371/22.1, 30, 37.7, 47.1, 48

[56] References Cited

U.S. PATENT DOCUMENTS

| | | | |
|---|---|---|---|
| 4,283,709 | 8/1981 | Lucero et al. | 463/25 |
| 4,582,324 | 4/1986 | Koza et al. | 463/16 |
| 4,652,998 | 3/1987 | Koza et al. | 463/26 |
| 4,660,833 | 4/1987 | Dickinson et al. | 273/143 R |
| 4,911,449 | 3/1990 | Dickinson et al. | 273/143 R |

*Primary Examiner*—Jessica J. Harrison
*Assistant Examiner*—Mark A. Sager
*Attorney, Agent, or Firm*—Claude A. S. Hamrick; Oppenheimer Wofff & Donnelly

[57] ABSTRACT

An operating system having a multitude of subsystems is provided where each subsystem performs a distinct function and may register with other subsystems to receive notification (or callbacks) upon the ocurrence of certain events. Moreover, the subsystems are programmed in such a manner where in the event of a fault (or exception) they can be instructed to cease the calling of other subsystems, thereby allowing each of the subsystems to complete its distinctive task without commencing further additional activities. When all of the activities have ceased, the state of the system as indicated by the parameters at the various registers and addresses are saved. At this time, the system can initiate a service call for an attendant through one of the provided mechanisms or routine calls. Moreover, the system can initiate an intermission (play stoppage) routine using full audio and video capabilities to explain to the player in a user-friendly manner the problems encountered and play a video clip or the like in entertaining and occupying the player.

17 Claims, 8 Drawing Sheets

METHOD AND APPARATUS FOR MANAGING FAULTS AND EXCEPTIONS

BACKGROUND OF THE INVENTION

1. Field of the Invention

This invention is generally related to fault tolerant recovery systems, and in particular, a fault-tolerant software system which maintains audio and visual capability in the event of a fault.

2. Description of the Prior Art

Game machines displayed in public entertainment localities are made available for public usage in exchange for payment. This is particularly the case for casinos and game parlors where there are a large number of machines. However, these machines occasionally malfunction and enter into a lock up state, ceasing all functions and leaving the player stranded. The player at the malfunctioned machine would either abandon the machine after a few attempts at "fixing" the machine, or wait for an attendant's assistance. In waiting for an attendant's assistance, it would be desirable to maintain the player's interest and keep the player occupied. One way of accomplishing this goal is to show a computer driven video clip using the existing hardware and software already provided by the machine. The content of the video clip can be determined by the management and can be periodically updated. In essence, the video clip can be thought of as a commercial or infomercial of some type.

In order to have the game machine play such a video clip with full audio and visual effects, the operating system software for the machine must be set up in a manner such that in the event of a fault, the integrity of the operating system, including the audio and video modules, are maintained.

Systems designed from presently available technologies handle faults in a very simplistic manner. Generally speaking, these systems would simply freeze up or display a simple message across the screen. In view of the presently available technology and the desire to play video clips in the event of a fault, a new system design is needed.

SUMMARY OF THE INVENTION

It is therefore an object of the present invention to provide an operating system structure which maintains full system integrity and functionality including audio and visual capabilities for the playing of a video clip in the event of a system fault.

It is another object of the present invention to provide an operating system that systematic and orderly manages a fault in the system.

It is yet another object of the present invention to provide an operating system having the ability to initiate and maintain another process or subprocess in the event of a fault in the system.

It is a further object of the present invention to provide an operating system which retains system state information at the time of a fault and returns the system back to the state at the time of the fault with the fault cleared.

Briefly, the present invention provides an operating system having a multitude of subsystems where each subsystem performs a distinct function and may register with other subsystems to receive notification (or callbacks) upon the ocurrence of certain events. Moreover, the subsystems are programmed in such a manner where in the event of a fault (or exception) they can be instructed to cease the calling of other subsystems, thereby allowing each of the subsystems to complete its distinctive task without commencing further additional activities. When all of the activities have ceased, the state of the system as indicated by the parameters at the various registers and addresses are saved. At this time, the system can initiate a service call for an attendant through one of the provided mechanisms or routine calls. Moreover, the system can initiate an intermission (play stoppage) routine using full audio and video capabilities to explain to the player in a user-friendly manner the problems encountered and play a video clip or the like in entertaining and occupying the player.

In order to achieve the above described desired functionalities, the architecture of the machine must be programmed in such a manner to facilitate the desired functionalities. More specifically, the modules of the operating system is processed by an event manager. Upon the detection of a fault, a series of steps are performed to "strangle" the system in order to gracefully stop the execution of the currently executing modules. Then, the state of the system is saved and a play stoppage application is started to entertain the player. The description herein uses a gaming machine for illustration purposes but is not limited to this type of machine.

The present invention is of special importance in the area of gaming machines where the user may have remaining credits on the machine at the time of the fault and the current state of the machine may affect the outcome of the game payout.

IN THE DRAWINGS

DETAILED DESCRIPTION OF THE PREFERRED EMBODIMENTS

Figure 1:
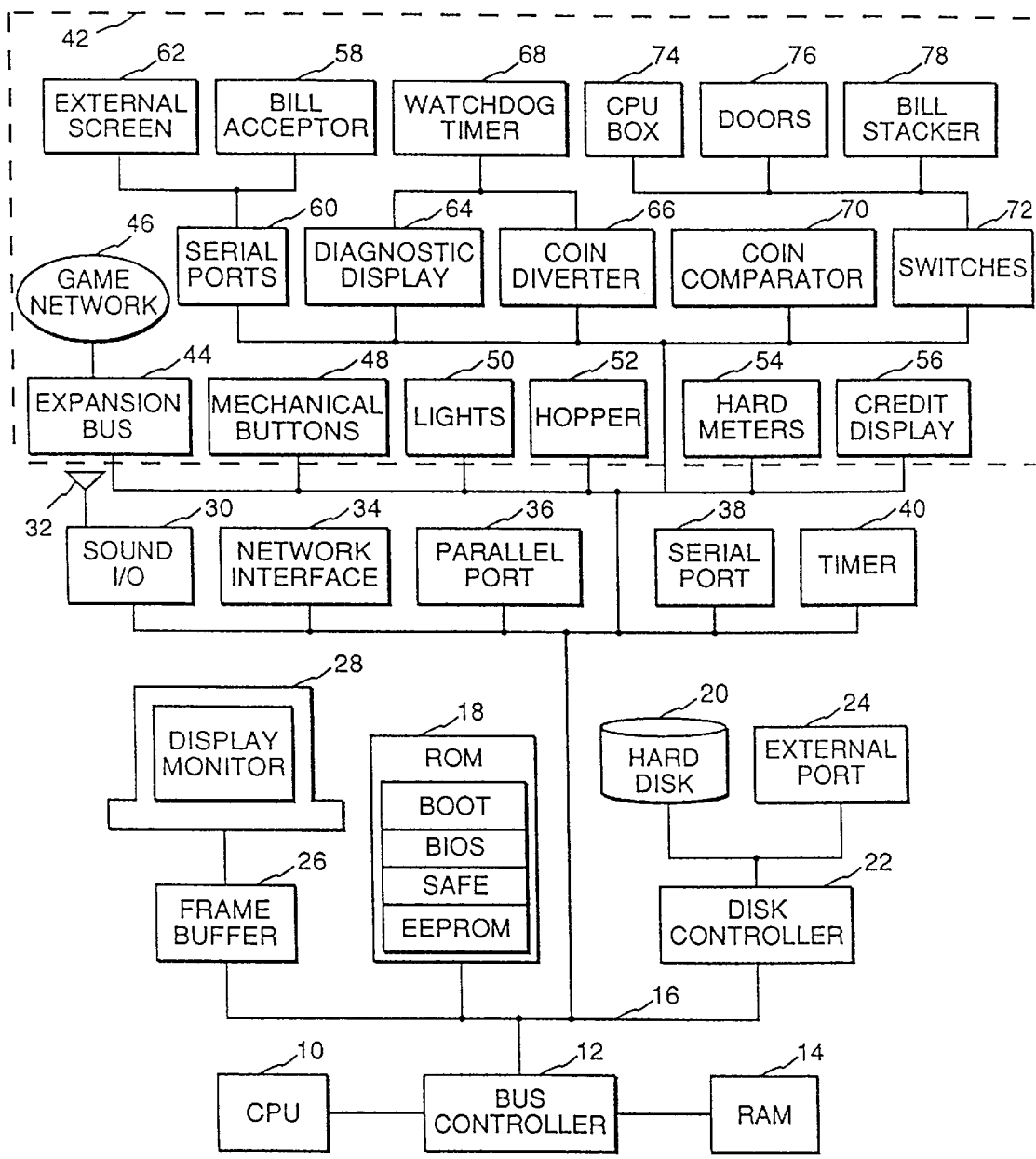
FIG. 1 illustrates a general block diagram of a gaming machine.

FIG. 1 illustrates in block diagram form the components of a general gaming system that may embody the present invention. A CPU 10 interfaces with a bus controller 12 to access information available from the various components and information from the RAM 14. The bus controller 12 sends and receives information via bus 16 to the various components. The bus is not limited to a particular type and can be an ISA bus, EISA bus, PCI bus or others. Moreover, it can be linked to an external bus connector to further extend the system. Upon powering-up of the system, information from the ROM 18 is read and is used to configure the initial operational parameters of the system. Further information can also be obtained from the hard disk 20 via the disk controller 22. The disk controller can be connected to an external disk drive port 24 for connection to external disk drives. In the operation of the system, information to be displayed is written to a frame buffer 26 and sent to a display monitor 28. There is also a sound input/out component 30 and a speaker 32 for the broadcast of sound information. The system can also be connected to a network via the network interface 34 such that a number of game machines can be connected for multi-player action. One or more parallel ports 36 and serial ports 38 provide connections to peripheral devices. A timer 40 provides clock pulses for synchronizing the components and the operation of the system. In this depictment of a gaming system, the components of the system dedicated to the operation of the game is illustrated in block 42 which can be a separate subsystem with its own system bus and the like. In the alternative, all of the components of the system can be integrated as a single system.

Here, in this illustration, there is an expansion bus 44 for connecting to the system a custom gaming network 46. There are mechanical buttons 48 providing for user selection and input. In response to a particular condition or system state, there are lights 50 that can be programmed to flash in certain colors or patterns. There is a hopper 52 which is a mechanism for tracking and dispensing coin drops and winnings. There is a hard meter for tracking in absolute terms the number of coins and bills accepted and the number of coins dispensed. An internal credit display 56 can be installed inside of the cabinet of the machine to display the available credits.

In this system, the bill acceptor 58 is connected via a serial port 60 and there is an external screen 62 connected to the serial port to display low level messages. There is also a diagnostic display 64 and a coin diverter 66, where both are connected to a watchdog timer 68. There is a coin comparator 70 that ascertains the type of coin received. There is also a switch interface 72 that receives signals from a number of switches, including a CPU box switch 74, one or more door switches 76, and a bill stacker switch 78.

Figure 2:
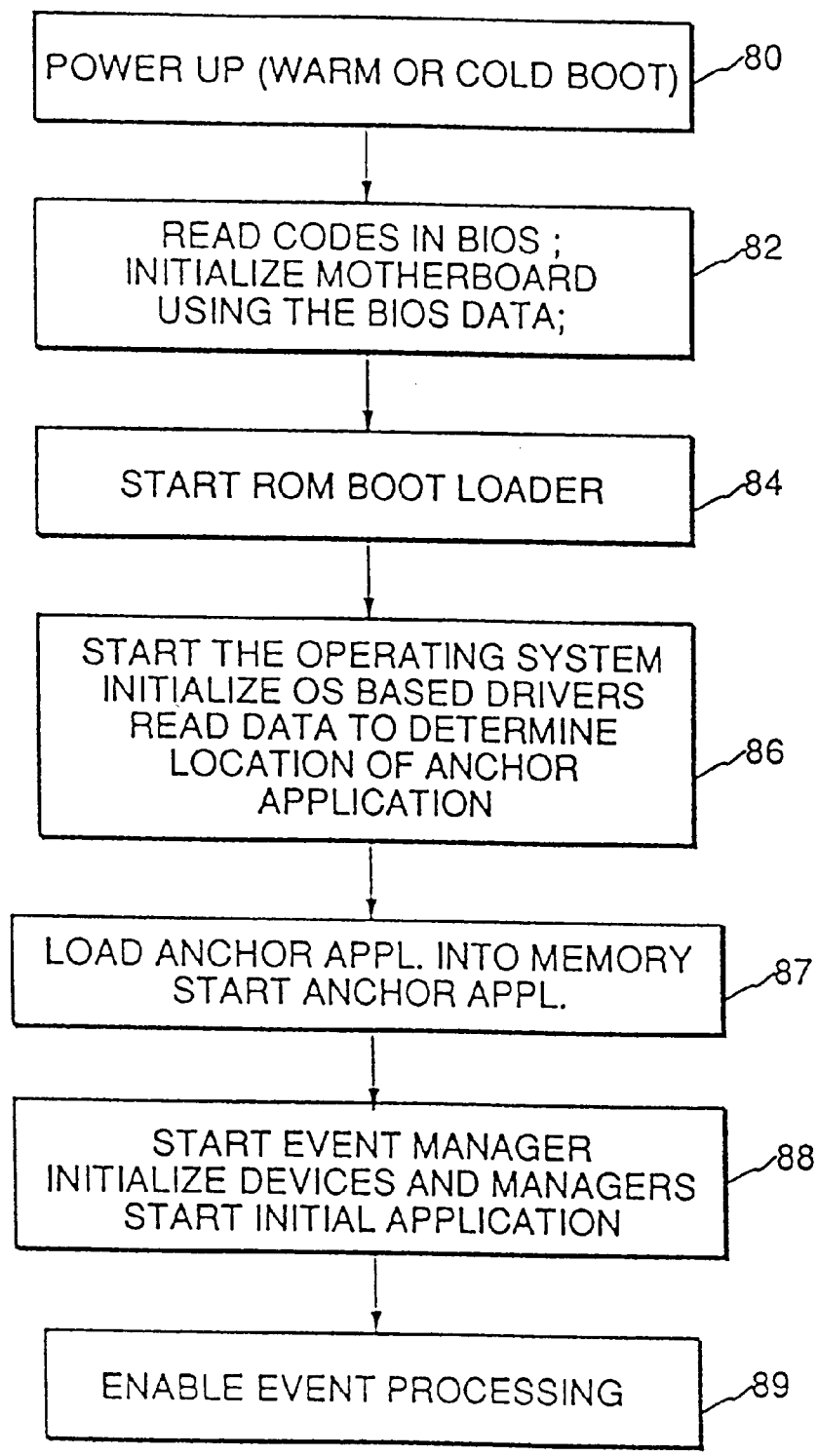
FIG. 2 shows the processing steps in powering up an embodiment of the present invention.

In starting up the system, referring to FIG. 2, the system boot process starts from a reset condition that is either a cold start process or a warm start process 80. A cold start process is started from a power off condition and power is supplied to the system to start the boot process. A warm start process is any reset that occurs after power is supplied to the system, and can be generated from pressing the reset button of the system, from the expiration of the watchdog timer, from a software generated reset, or from certain system faults.

When the system starts from either a warm boot or a cold boot, it reads and executes codes located in the ROM BIOS portion 82 of the Read Only Memory (ROM). The BIOS code is responsible for initializing all of the devices located on the motherboard. Once the motherboard is initialized, the system executes the ROM Boot Loader codes 84.

The ROM Boot Loader starts the operation system 86 and initializes the drivers that are linked with the operating system 86, including drivers for the hard disk-controller, the serial port, the ethernet port, the interrupt service routines, etc. Once the operating system is running, the ROM Boot Loader reads the machine configuration data from an EEPROM 86 where the configuration data will indicate the location of the anchor application, which is the main program for the system. The anchor application is then loaded into memory (from either the network or the disk) and the system executes the loaded anchor application 87.

The anchor application contains the bulk of the system and application codes, including additional drivers and API's, which include memory manager, shell, frame buffer event manager, the hopper, buttons, meters, coin diverter, bill acceptor, threaded file I/O, FIP daemon, cashier, display manager, hotspot manager, sound manager, deferred execution managers, etc.

Before the anchor application is loaded, the system is in a minimal state with virtually no I/O interaction except for the diagnostic display (a LED display). The reason for this rather crippled state is because nearly all of the device drivers and API's are located in the anchor application.

Event Manager

As part of the anchor application, the event manager is started next 88. The event manager is responsible for collecting non-fatal exceptions and starting an application based on the type of exceptions received. Events are delivered to the event manager via a queue and are posted by various driver routines when they detect an event that the event manager needs to process. The event manager is implemented as a very high priority task that polls the queue for events. When an event is accepted by the event manager 89, it is evaluated along with all other outstanding events to determine the corresponding action to undertake. Some events cause play stoppage to begin while other events cause play stoppage to be cleared.

Figure 4:
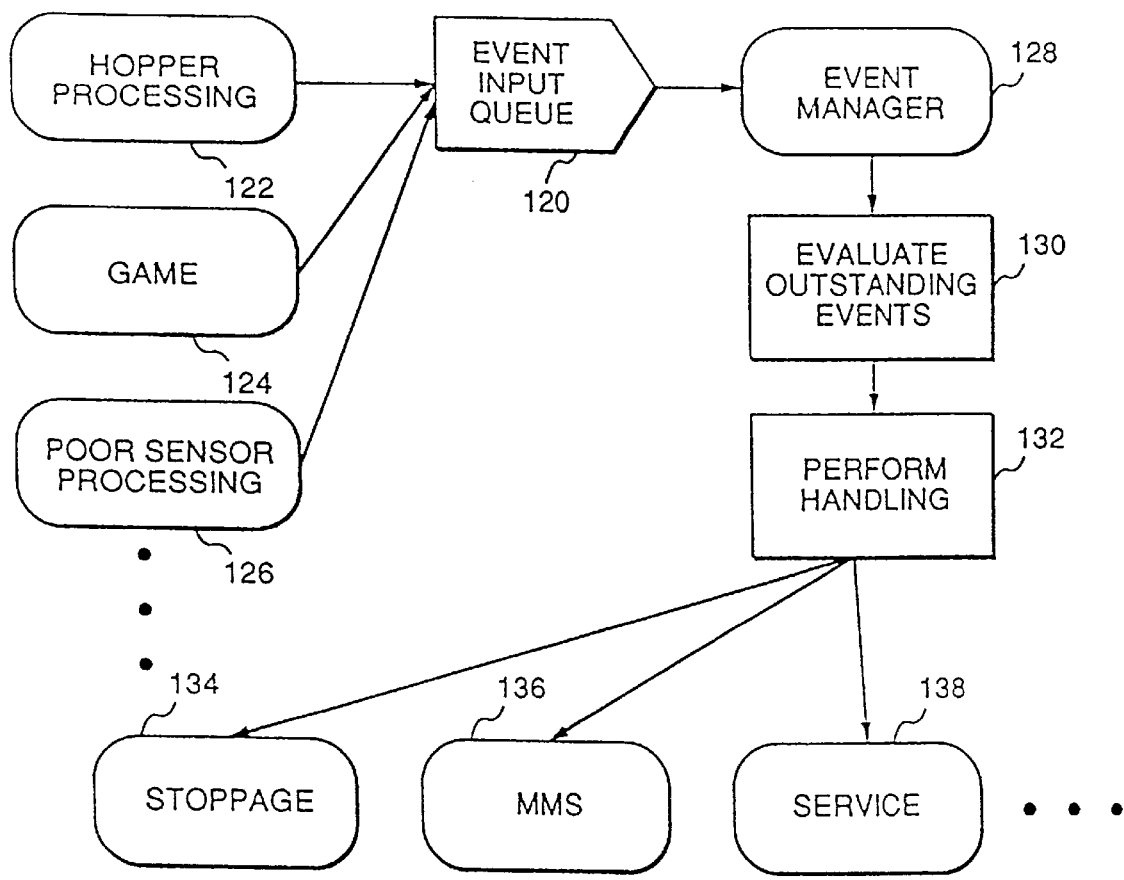
FIG. 4 illustrates the processing steps performed by the event manager.

FIG. 4 illustrates an event processing scheme of the preferred embodiment of the present invention. There is an event input queue 120 that receives event notifications from a variety of sources. These sources can include a notice from the hopper processing module 122, the game module 124, the door sensor processing module 126 or other modules. The notification of the events in the event input queue 120 are processed by the event manager 128. The event manager evaluates the outstanding events 130 and performs handling of these events by calling a corresponding action which can be the calling of a play stoppage application, the starting of a machine management system 136, or the activation of a service signal 138.

Boot Failures

If an error or failure occurred in the boot sequence, the failure must be reported to a technician so the problem can be corrected. The system can report failures in two different ways. If a failure is critical and occurs before the boot sequence is completed, the minimal reporting mechanism, the diagnostic display (LEDs), is used. If a failure is non-critical and the anchor application initialization process successfully completes, the error is reported using the high level error reporting mechanism, which is play stoppage.

With respect to the minimal reporting mechanism as the system initializes, it will, at each step of the boot process, write a diagnostic code to the diagnostic display. When a critical failure occurs, the diagnostic code will tell the technician where in the sequence the problem has occurred. For example, just before the SCSI driver is initialized, a code of "104" is displayed. When the SCSI initialization completes, the code is updated to "105". If a problem occurred in the SCSI initialization, the system halts and would not update the code to 105. When the technician checks the error code, he or she will see code 104 which indicates that the SCSI subsystem is the source of the problem.

If additional information is needed about a low level failure, a serial port can be connected to an external subsystem to display expanded information of the boot process.

For errors that occur after the system has completed the initialization process or for non-critical errors found during the initialization process, they can be reported using the graphical interface. If a non-critical error occurs during the anchor application initialization sequence, the startup message sent to the event manager would indicate to the event manager that the trouble shooting Machine Management System (MMS) and/or a stoppage application should be executed rather than a game application. The MMS would cause the stoppage application to put up an out of service message and wait for a technician to turn the MMS key switch to enter the MMS diagnostics mode.

For a minor error where a player could still use the machine (e.g. network link down), the event manager can be programmed to allow game play and run a game application. A light strobe or signal would be lit to indicate that the machine is having some problems but otherwise the machine operates normally.

Exception Handling

Exceptions are errors or events that can interrupt the system at any time. Exceptions are classified in one of two ways, fatal and non-fatal.

Fatal exceptions are serious enough to cause the system to shut down. When a fatal exception occurs, the system writes a diagnostic code to the diagnostic display and locks up. The technician then troubleshoots the problem using the diagnostic code. These errors are considered serious enough that the continuation of code execution could jeopardize the integrity of the system or cripple the system to a point that the MMS could not be ran. Some examples of fatal exceptions include: hard disk failure, certain RAM errors that are not recoverable, corrupted program code, processor faults, OS internal errors, etc.

The fatal error handler turns on the signal strobe and hangs or ceases system operation until the system resets. In order to 'hang' the system, the handler continuously resets the watchdog timer so that the watchdog timer does not expire and reset the system. For fatal errors where an automatic restart of the system would clear the problem, the handler resets the system via a software reset.

Non-fatal exceptions are handled using play stoppage. When a non-fatal exception is detected, the event manager is notified of the event. The event manager evaluates the event and determines the stoppage application to execute. Examples of non-fatal exceptions include: hopper jams, coin jam, door open, bill acceptor failure, hand-pay jackpots, network out of service, etc.

System Software Components

Figure 3A:
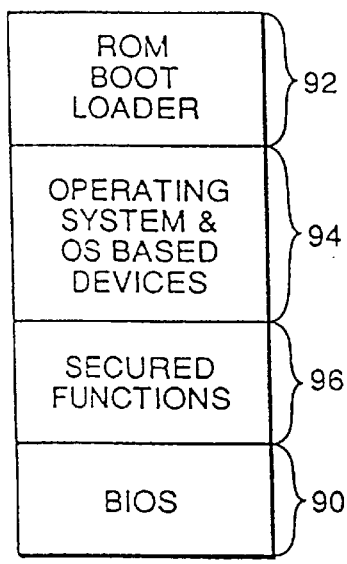
FIG. 3a shows the type of data in the ROM.

FIG. 3a illustrates the types of data in the ROM, which includes codes for the ROM Boot Loader, the operating system, the operating system based devices, the secured functions, and the BIOS.

Figure 3B:
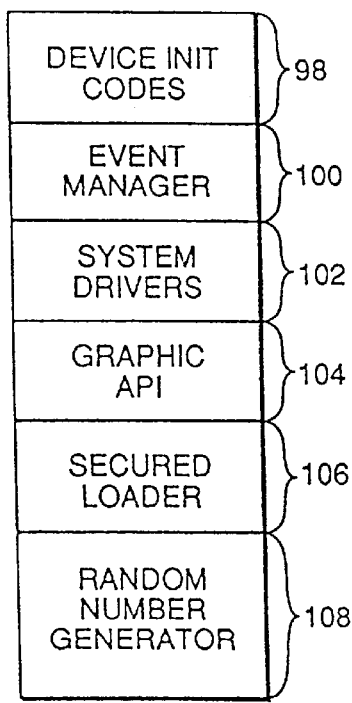
FIG. 3b shows the components in the anchor application.
Figure 3C:
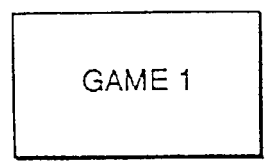
FIGS. 3c–3e shows the type of applications that can be started by the anchor application.
Figure 3D:
Figure 3E:
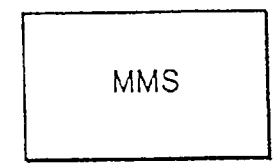

FIG. 3b illustrates the major components of the anchor application which includes device initiation codes 98, the event manager 100, system drivers 102, graphics application interface 104, secured loader 106 and a random number generator 108. FIGS. 3c to 3e each is a loadable application to be handled by the anchor application. More specifically, FIG. 3c is a game application, FIG. 3d is a play stoppage application, and FIG. 3e is the Machine Management System.

Application Launching

There are two ways to launch an application using the Event Manager, a "normal" way and an "interrupting" way.

When the system starts, the navigator, which is an application providing a number of game selections, is launched by the event manager. If the navigator is asked by the user to launch a game, it sends a corresponding launch message to the event manager. This type of launch is "normal" in that it does not interrupt other applications. If multiple applications are launched using the normal scheme, they would run in parallel.

Applications that are "interrupting" type of applications, such as play stoppage, use a "push/pop" style of launching. When a stoppage application is executed, any currently executing application is first paused, and then the stoppage application is ran. When the stoppage application completes execution, the application that was interrupted is resumed from the point it was interrupted.

When an interrupting application is to be ran, the state of the machine is remembered. The state includes both the hardware and the software states. Interrupting applications are serviced in a Last In First Out (LIFO) fashion. If an interrupting application is itself interrupted, the current state of the machine is saved again and the second interrupting application would run. When the second application finishes, the machine state is rolled back to the point where the first interrupting application was executing when it was interrupted. This method of operation can be thought like that of a stack operation. When a play stoppage application is about to be executed, the system state is "pushed". When the play stoppage application completes, the state is "popped".

Callback Structure

The subsystems of the preferred embodiment of the present invention are programmed in a callback scheme where each subsystem may register with another subsystem to receive information and notification in the event of an occurrence of certain events. Once a subsystem (client) is registered with another subsystem (host) and upon the occurrence of a predefined event at the host system, the host subsystem sends the client subsystem a notification (or callback request) of the event. Upon receiving the callback, the client subsystem handles the callback accordingly. For example, a game subsystem (client) registers with the button subsystem (host) for a callback so that when a particular button is pressed, the button subsystem would inform the game subsystem of the particular button pressed. When a button is actually pressed, the button subsystem processes its callback list. In the process, the game subsystem being on the callback list is informed of the particular button pressed and the corresponding code in the game subsystem is executed. Under this structure, each subsystem has a callback list.

Pushed State

When a subsystem is asked to push its state, the subsystem will save away enough information so that the state of the controlling software and hardware can be restored at a later time. In addition, it will save data structures representing the current state of the subsystem. Once the state information is saved, the data structures, software parameters, and hardware are set to a "clean" state, which means setting the hardware to the normal idle state and disconnecting any clients that may be receiving information about this subsystem.

A push of the subsystem can be thought of in terms of levels. For example, the normal idle state has a level of 1. When the subsystem is pushed, the level is incremented to 2. If pushed again, the level would go to 3. When a pop occurs, the level is decreased back down to 2. When an event occurs in a subsystem, only those clients that are registered with the subsystem at the current level are called. So, if the level were 3, only level 3 clients would get a callback.

The net effect of a push is to make the system available for starting up a new virtual machine for an interrupting application such as the play stoppage application. The currently executing virtual machine will be "frozen" and restored when the play stoppage application completes.

Figure 5:
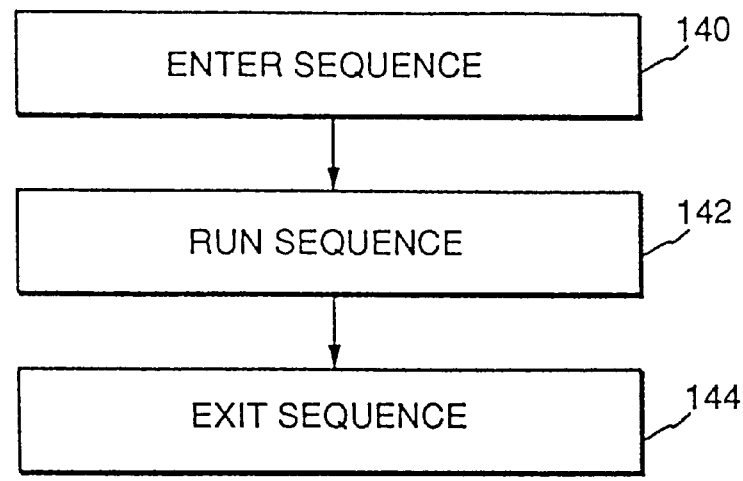
FIG. 5 illustrates the general steps in interrupting a running application.

Referring to FIG. 5, the processing steps for pushing, popping and launching generally can be categorized in blocked steps including an enter sequence step 140, a run sequence step 142, and an exit sequence step 144.

Enter Sequence

When a play stoppage application (an interrupting application) needs to be loaded and executed, a series of steps need to be taken in order to perform the high level push operation. This sequence of operations is called the "enter sequence". An enter sequence performed by the event manager is illustrated in FIG. 6a.

Figure 6B:
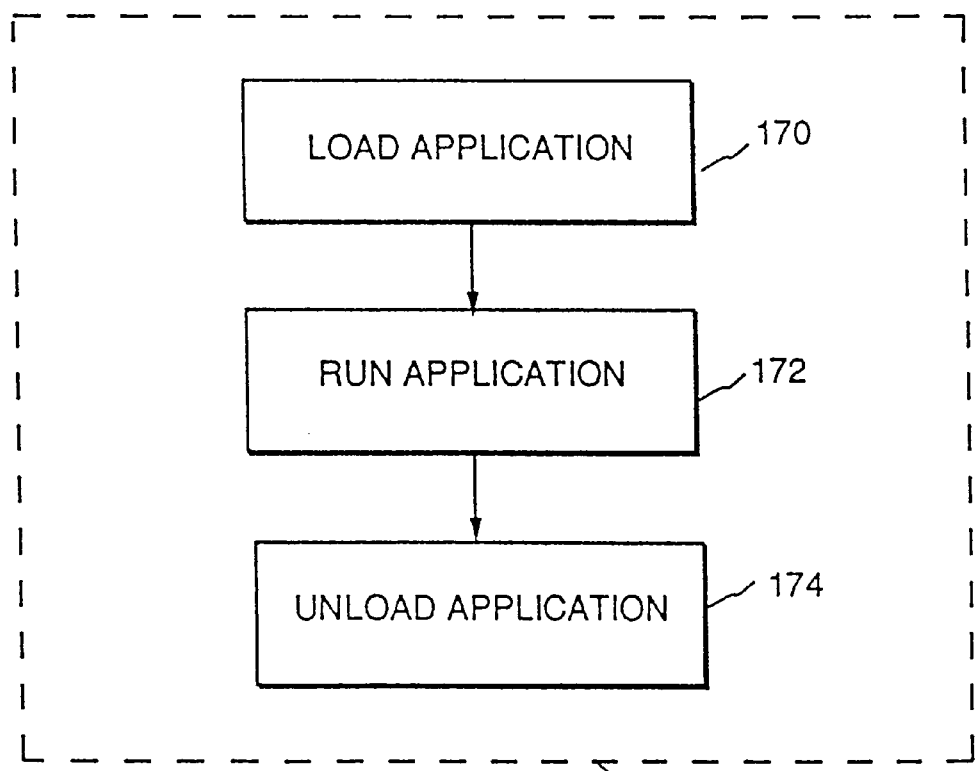
FIG. 6b shows the substeps in the run sequence step.
Figure 6A:
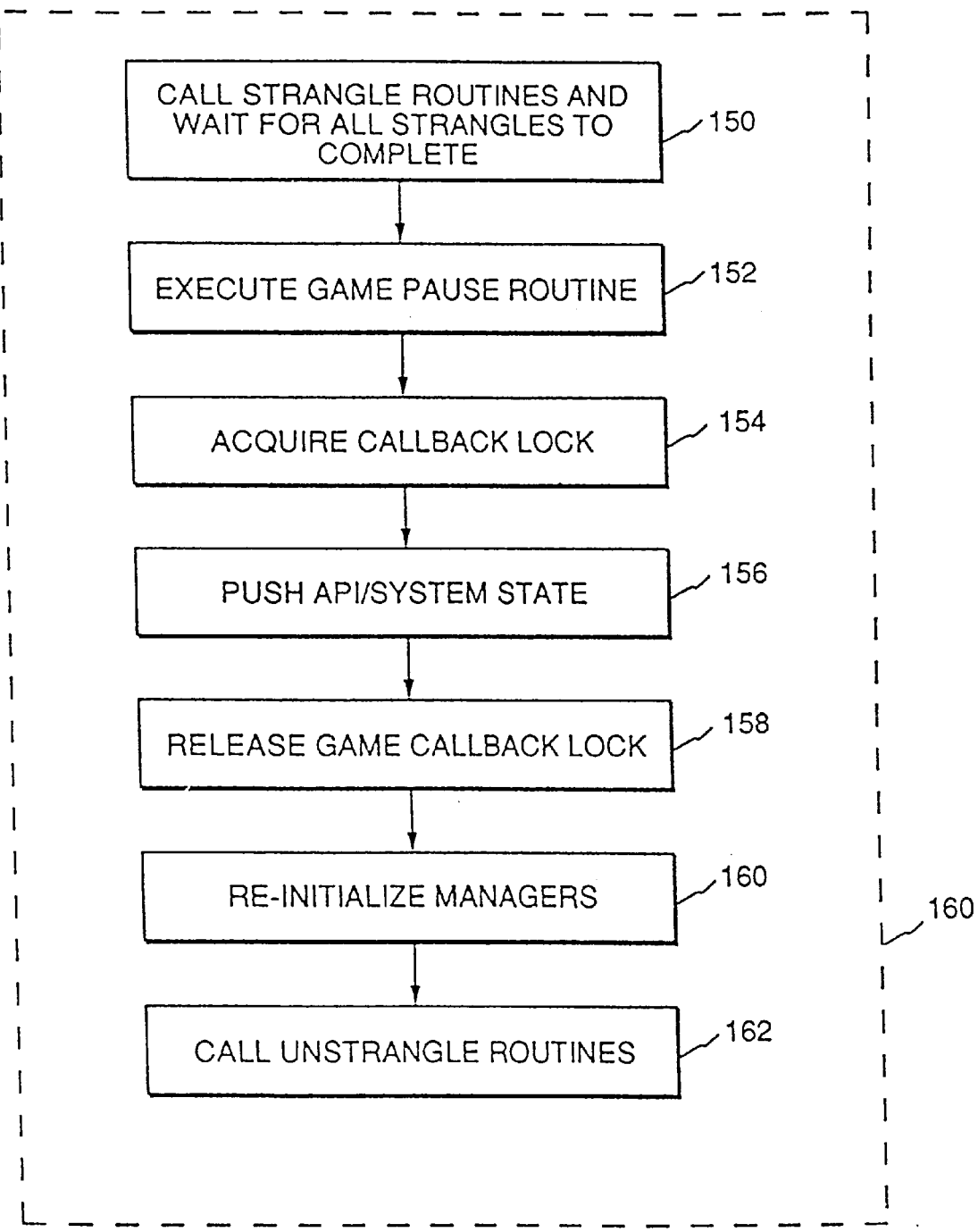
FIG. 6a shows the processing substeps for the enter sequence step.

Referring to FIG. 6a, the enter sequence starts by calling a strangle routine as indicated at 150. The strangle routine asks each and every subsystem to "strangle" or to stop any initiation of new callbacks by one subsystem to another subsystem. The stop of any callbacks is not an immediate stop. If a subsystem is in the middle of processing its callback list, the subsystem is allowed to finish the callbacks on the list in order to allow the subsystem to come to a good stopping point. Once all the callbacks for a subsystem are completed, the subsystem informs the event manager that it has completed its strangle routine.

When all the subsystems are successfully strangled, the pause routine for the current application is called 152 to pause it. When an application is started, it registers with the event manager a callback routine for pause and resume. For certain game applications this routine performs no particular function because these applications are run entirely within the callback context. Since all callbacks to the game have been disabled via the strangle function, no additional processing steps are needed to pause these applications.

The callback lock 154 is used to ensure that no additional callbacks occur. This is a special lock in that only during the enter sequence does using the lock have the potential to cause the game to depend on the lock. If the enter or exit sequence is not being executed, the lock will always be granted to the game.

Now that the subsystems have been strangled and the game callback lock has been acquired, the subsystems now can be pushed to make a new virtual environment 156. Here, each subsystem's push routine is called by the event manager, where each push operation saves the respective subsystem's list of registered callback clients and the subsystem's predetermined software and hardware information.

Once all subsystem information have been pushed, the callback lock is released to allow the execution of other applications 158. The system is still strangled at this point, so no callbacks will occur yet. The list and the subsystem parameters are then cleared for a new virtual environment 160.

The last step of the enter sequence is the calling of the unstrangle routine 162 where all subsystems are allowed to execute callbacks again.

Run Sequence

After the enter sequence is performed, a new virtual machine is ready for use by a stoppage application (or any other interrupting application). Referring to FIG. 6b, a stoppage application is loaded 170 and executed by the event manager 172. The stoppage application and its respective subsystems would register with the various subsystems for callbacks just like a game application. The stoppage application also registers with the event manager its exit callback routine. The event manager will call this routine when an event that would clear the currently executing stoppage application is received. For each event that is received by the event manager, the event manager checks to see if the stoppage application should be cleared. If the event clears the stoppage, the exit callback routine for the stoppage application would be executed. After the stoppage application completes its cleanup, it sends an END_OF_STOPPAGE event to the event manager. The end-event signals the event manager to unload the stoppage application and begin the exit procedure 174.

An alternative to having the event manager clearing the stoppage application is to put all of the clear stoppage code within the stoppage application itself. For example, the door open stoppage would wait for a door close event and then exit. One problem with having the stoppage application determine events is that the clear event may occur while the stoppage application is being interrupted. If, for example, the door open stoppage application was interrupted by the MMS and then the door was closed while the MMS was running, the open stoppage application would not see the door close event when it resumed execution. Thus, the alternative method is not generally used.

Exit Sequence

Figure 6C:
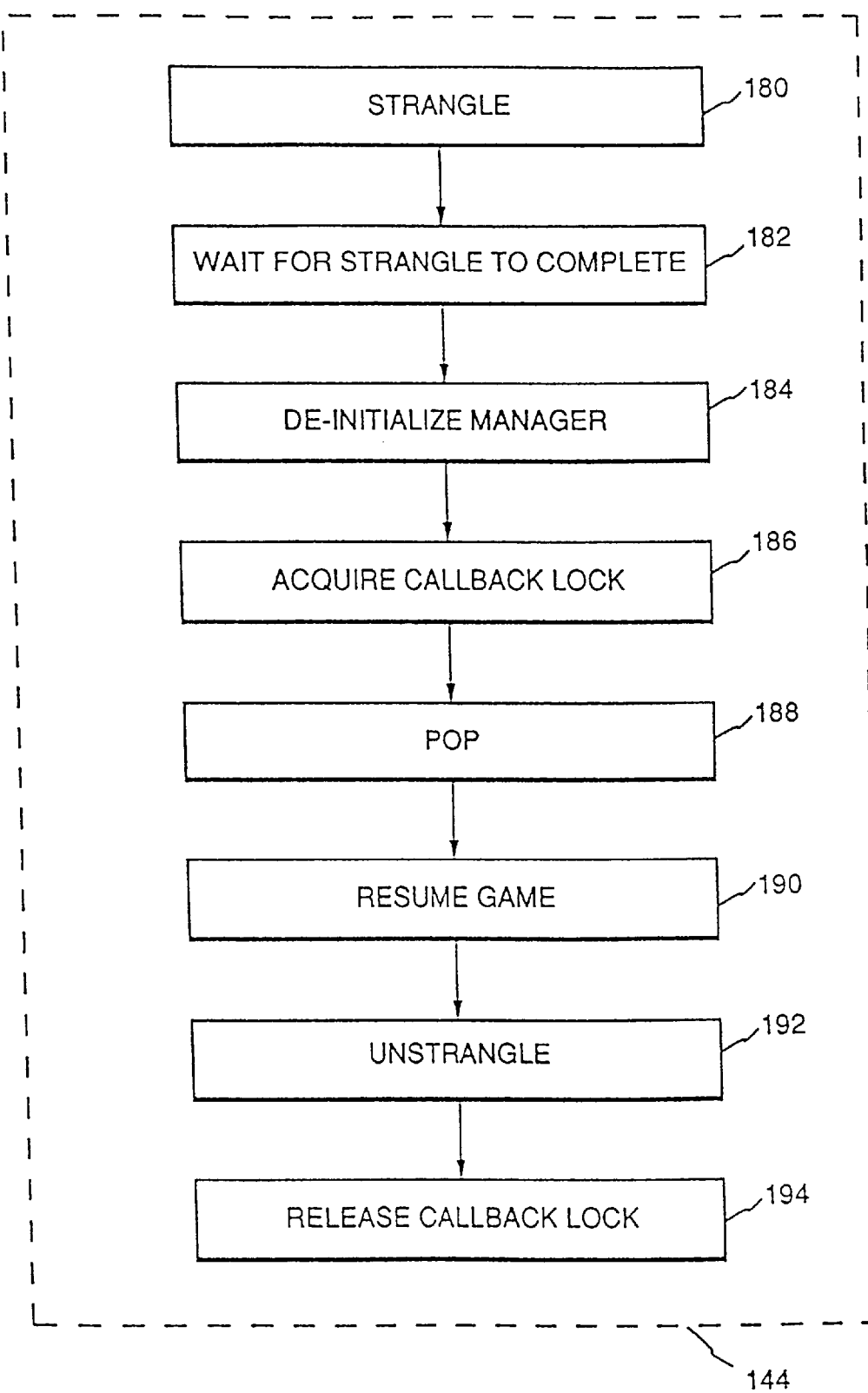
FIG. 6c illustrates the substeps in the exit sequence step.

The exit sequence is performed after the event causing the stoppage has been cleared. The exit sequence steps are illustrated in FIG. 6c.

Once the play stoppage application has been completed and cleared, the virtual machine that was created during the enter sequence needs to be unloaded in order to restore the previous virtual machine. The first operation is to strangle all subsystems to stop all callbacks 180. When the strangling completes, the subsystems that registered callbacks with other subsystems remove their callback registrations (de-init) 184.

After the callback lock is acquired 186, the event manager calls the pop routine for each of the subsystems 188. A pop operation will restore the subsystem's hardware and data structures to their previously pushed state. This means that the callback lists for the subsystems will be restored to the previous state. The game is then allowed to resume 190, the system is unstrangled 192, and the callback lock released 194.

Play Stoppage Application

The Play Stoppage application is an application that runs any time there is an interruption to the gaming experience. This application is comprised of a number of short linear segments that keep the player entertained until the machine can be returned to play. Events that can trigger the play stoppage application include a hopper fill event, a jackpot event, a coin jam event, a hopper jam event, and a service call. It is preferable that when play stoppage occurs, a dramatic audio visual experience occurs within the provided environment, indicating that something has happened.

Figure 7:
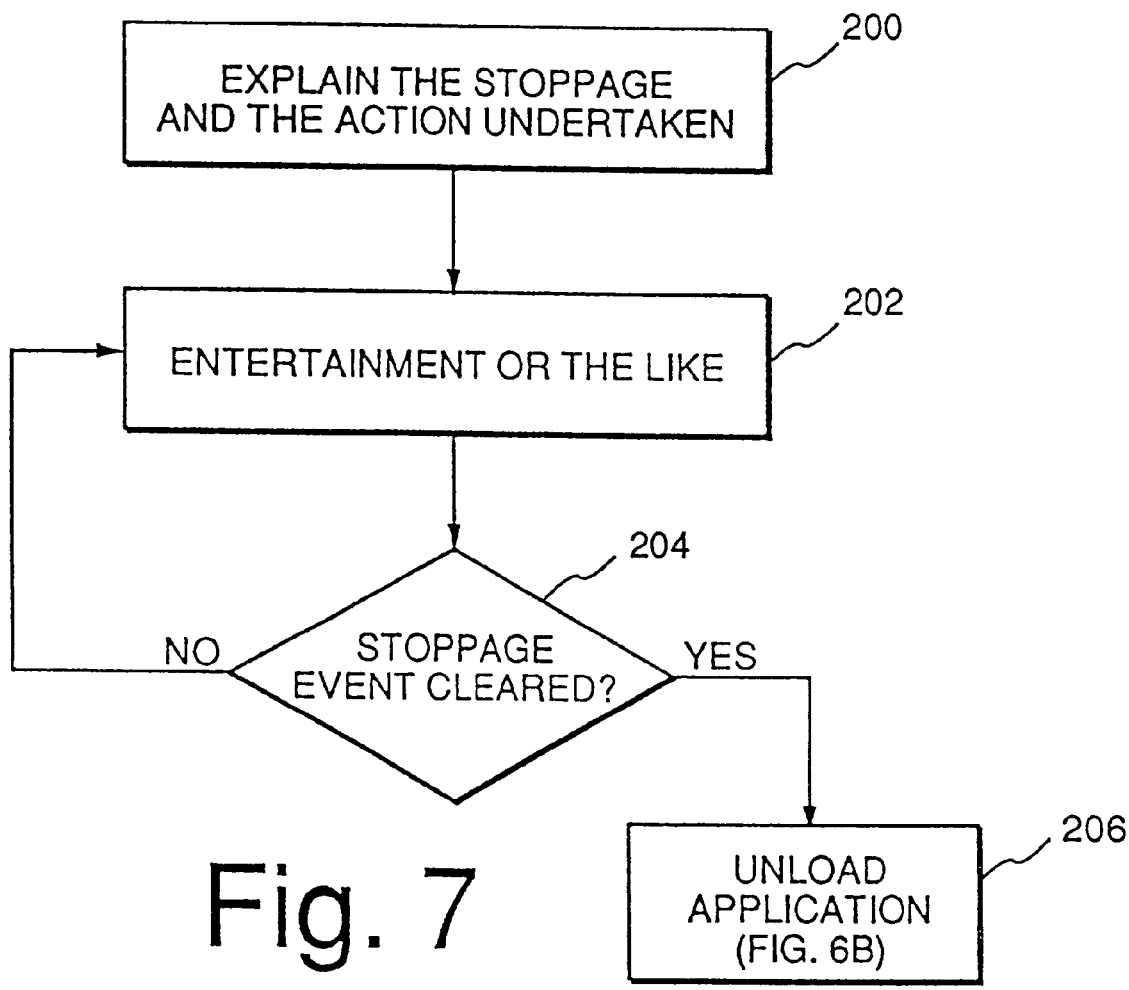
FIG. 7 illustrates a simple flow diagram for the play stoppage application.

In a narrative fashion, referring to FIG. 7, the player is provided with an explanation of the problem as well as the action undertaken to solve the problem 200. Since the necessary action required for solving the problem may require certain amount of time, entertainment of some type is provided to the player 202. If the event causing the play stoppage has been cleared, the play stoppage application is unloaded 206. Otherwise, the play stoppage application continues with the playing of the entertainment.

MMS Interactions

The MMS is launched by the event manager when a MMS key turn is detected. When the MMS is running, no event will cause a stoppage application to execute (the MMS is not interruptible).

Some stoppage applications will want to change the behavior of the MMS key. For example, the hand-pay stoppage application uses an MMS key turn as an indication that the hand-pay information window should be displayed. In this case, the MMS will not be launched when the key is turned. The event manager needs to be informed by the stoppage application that it wishes to disable MMS launches via the key switch. These stoppage applications should provide a way for the technician to launch the MMS from the application itself. For example, in the hand-pay stoppage application, the MMS key will bring up a dialog that contains information needed to complete the stoppage transaction. There is a button in the dialog that when pressed runs the MMS. By turning the key, the technician has indicated that the transaction is being serviced.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What we claim is:

1. In a gaming system having electrical and mechanical subsystems for facilitating play of a game, a method for maintaining and providing audio and visual functionalities in said system should a fault occur in one of the subsystems during game play, each of the subsystems having a number of functional parameters defining the operational state of that subsystem and a corresponding callback list listing other subsystems to be notified upon occurrence of a particular pre-defined event, comprising the steps of:

a) detecting the occurrence of a fault generated in one of said subsystems;
   b) generating a strangle request and communicating such request to each of said subsystems to cause each subsystem to complete any already-started processing of the callback list corresponding thereto in response to a previous event and to inhibit each subsystem from initiating new processing of the corresponding callback list in response to the occurrence of a new event;
   c) storing the functional parameters and callback list of each subsystem;
   d) re-initiating each of said subsystems; and
   e) loading and activating an intermission routine utilizing audio and visual subsystems to play an audio-visual video clip to occupy the attention of the system user until the fault is cleared.

2. A method as recited in claim 1 further including the steps of:

f) correcting said fault in said system;
   g) terminating and unloading said intermission routine;
   h) restoring the stored functional parameters and callback list to each of the subsystems; and
   i) restarting said system and said subsystems using the stored functional parameters and callback lists.

3. A method as recited in claim 1 wherein said system includes an event manager having an event queue for storing incoming events, said event manager processing said incoming events in the order stored in said event queue and causing execution of a corresponding routine in response to the particular incoming event.

4. A method as recited in claim 2 wherein said system includes an event manager having an event queue for storing incoming events, said event manager processing said incoming events in the order stored in said event queue and causing execution of a corresponding routine in response to the particular incoming event.

5. A method as recited in claim 3 where upon receiving a clearing event, said event manager causing said intermission routine to terminate and unload.

6. A method as recited in claim 3 wherein the corresponding routines include an intermission routine, a machine management system routine, and a service light routine.

7. A method as recited in claim 3 wherein the incoming events include a hopper error event, a door-open event, and a subsystem exception event.

8. A method as recited in claim 1 wherein said intermission routine comprises the steps of:

1) processing said audio-visual clip;
   2) checking for an event-cleared flag;
   3) if said event-cleared flag is set, terminating and unloading said intermission routine; and
   4) if said event-cleared flag is not set, repeating from step 1).

9. A method for use in a fault tolerant computer operating system having a plurality of subsystems each having a corresponding callback list of other subsystems, wherein upon the occurrence of a particular event in a particular subsystem, the other subsystems on its callback list are notified, comprising the steps of:

a) detecting the occurrence of a fault in said operating system;
   b) calling and requesting each subsystem to perform a strangle routine causing the completion of processing of existing callbacks;
   c) acquiring a callback lock inhibiting the processing of new callbacks;
   d) storing functional parameters and the callback list of each subsystem;
   e) loading an intermission application including the play of an audio-visual video clip and initializing a new callback list for each subsystem;
   f) executing said intermission application;
   g) releasing said callback lock to allow initiation of new callbacks; and
   h) calling an unstrangle routine to permit the processing of new callbacks.

10. A method as recited in claim 9 further including the step of:

i) upon the occurrence of a clearing event, unloading said intermission application.

11. A method as recited in claim 10 further including the steps of:

j) restoring the stored functional parameters and callback list for each subsystem; and
    k) resuming operation of said subsystems using said restored functional parameters and callback lists.

12. A method as recited in claim 9 wherein said system includes an event manager having an event queue for storing incoming events, said event manager processing said incoming events in the order stored in said event queue and causing a corresponding routine to be executed in response to the particular incoming event.

13. A method as recited in claim 11 wherein said system includes an event manager having an event queue for storing incoming events, said event manager processing said incoming events in the order stored in said event queue and causing a corresponding routine to be executed in response to the particular incoming event.

14. A method as recited in claim 12 wherein upon receiving a clearing event, said event manager causes said intermission routine to terminate and unload.

15. A method as recited in claim 12 wherein the corresponding routines include an intermission routine, a machine management system routine, and a service light routine.

16. A method as recited in claim 12 wherein the incoming events include a hopper error event, a door-open event, and a subsystem exception event.

17. A method as recited in claim 9 wherein said intermission application comprises the steps of:

1) processing said audio-visual video clip;
2) checking for an event-cleared flag;
3) if said event-cleared flag is set, terminating and unloading said intermission application; and
4) if said event-cleared flag is not set, repeating from step 1).

* * * * *